United States Patent
Song et al.

(10) Patent No.: US 7,437,076 B2
(45) Date of Patent: Oct. 14, 2008

(54) DATA TRANSMISSION METHOD IN GIGABIT ETHERNET PASSIVE OPTICAL NETWORK

(75) Inventors: Jae-Yeon Song, Seoul (KR); Yun-Je Oh, Yongin-shi (KR); Tae-Sung Park, Suwon-shi (KR); A-Jung Kim, Seoul (KR); Shin-Hee Won, Seoul (KR); Min-Hyo Lee, Suwon-shi (KR); Su-Hyung Kim, Songnam-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 561 days.

(21) Appl. No.: 10/382,439

(22) Filed: Mar. 6, 2003

(65) Prior Publication Data
US 2003/0170032 A1  Sep. 11, 2003

(30) Foreign Application Priority Data
Mar. 11, 2002  (KR) .................. 10-2002-0013060

(51) Int. Cl.
*H04J 14/08* (2006.01)
*H04J 14/00* (2006.01)

(52) U.S. Cl. .................................. 398/99; 398/100
(58) Field of Classification Search .................. 398/63, 398/98, 99, 100, 101, 102, 103
See application file for complete search history.

(56) References Cited

U.S. PATENT DOCUMENTS

| | | | | |
|---|---|---|---|---|
| 5,559,624 | A * | 9/1996 | Darcie et al. ................. | 398/72 |
| 5,930,018 | A * | 7/1999 | Effenberger ................ | 398/161 |
| 6,546,014 | B1 * | 4/2003 | Kramer et al. .......... | 370/395.41 |
| 6,690,892 | B1 * | 2/2004 | Effenberger ................ | 398/168 |
| 6,868,232 | B2 * | 3/2005 | Eijk et al. ..................... | 398/5 |
| 7,260,116 | B2 * | 8/2007 | Ota et al. .................... | 370/477 |
| 2002/0009080 | A1 | 1/2002 | Engstrand et al. | |
| 2002/0171895 | A1 * | 11/2002 | Chang ........................ | 359/168 |
| 2003/0007211 | A1 * | 1/2003 | Gummalla et al. .......... | 359/136 |
| 2003/0027585 | A1 * | 2/2003 | Ohnishi ...................... | 455/503 |

(Continued)

FOREIGN PATENT DOCUMENTS

CN  1434580  6/2003

(Continued)

OTHER PUBLICATIONS

"GE-PON Grant/Request Method for High Bandwidth Efficiency and Low Latency;" The Proceedings of the 2002 IEICE General Conference; Mar. 27-30, 2002, Waseda University, Tokyo.

*Primary Examiner*—Christina Y Leung
(74) *Attorney, Agent, or Firm*—Cha & Reiter, LLC

(57) ABSTRACT

Disclosed is a upstream data transmission method in a gigabit Ethernet-passive optical network (GE-PON) system. In the GE-PON system including an optical line termination having a scheduler and optical network units connected to the optical line termination, the optical line termination receives bandwidth allocation request signals from the optical network units at a start of a first cycle, allocates transmission bandwidths to the respective optical network units in accordance with the bandwidth allocation request signals, and transmits the allocated transmission bandwidths to the respective optical network units before a second cycle that follows the first cycle.

2 Claims, 4 Drawing Sheets

U.S. PATENT DOCUMENTS

2003/0179769 A1 * 9/2003 Shi et al. .................. 370/442

FOREIGN PATENT DOCUMENTS

| EP | 1311137 | A2 | 5/2003 |
| EP | 1342106 | | 9/2003 |
| JP | 2001-203737 | | 7/2001 |
| WO | WO 01/93498 | | 12/2001 |

* cited by examiner

| PACKET | | | | | | | |
|---|---|---|---|---|---|---|---|
| ADDED BY TRANSMITTER, STRIPPED BY RECEIVER | | DATA FRAME (SENT BY USER) | | | | | ADDED BY TRANSMITTER (OPTION) |
| | | DATA FRAME (DELIVERED TO USER, CRC IS OPTIONALLY STRIPPED BY RECEIVER) | | | | | |
| PREAMBLE | SFD | DESTINATION ADDRESS | SOURCE ADDRESS | TYPE | LLC DATA | PAD | CRC |
| 7BYTES | 1 | 6BYTES | 6BYTES | 2 | 0~1500 | 0~46 | 4BYTES |
| | | | | HIGH-LOW | ... | ... | MSB ... LSB |

FIG.1
(PRIOR ART)

DATA TRANSMISSION METHOD IN GIGABIT ETHERNET PASSIVE OPTICAL NETWORK

CLAIM OF PRIORITY

This application claims priority to an application entitled "Data transmission method in gigabit Ethernet-passive optical network", filed in the Korean Intellectual Property Office on Mar. 11, 2002 and assigned Serial No. 2002-13060, the contents of which are hereby incorporated by reference.

BACKGROUND OF THE INVENTION

1. Field of the Invention

The present invention relates to a gigabit Ethernet-passive optical network (hereinafter referred to as "GE-PON"), and more particularly to a data transmission method used in a GE-PON architecture.

2. Description of the Related Art

In order to construct a network from a telephone office to a building or home, diverse network structures such as an xDSL (x-digital subscriber line), HFC (hybrid fiber coax), FTTB (fiber to the building), FTTC (fiber to the curb), FTTH (fiber to the home), etc., with different multiplexing schemes have been implemented. Among such diverse network structures, FTTx (x=B, C, H) may be classified into an active FTTx, which is configured by an active optical network (hereinafter referred to as "AON") construction, and a passive FTTx, which is configured by a passive optical network (hereinafter referred to as "PON") construction. The later construction has been favored due to its economical and simple network construction, which includes a point-to-multipoint topology incorporating the passive elements.

The passive optical network (PON) is formed of a distributed tree structure topology in which one optical line termination (hereinafter referred to as "OLT") is connected to a plurality of optical network units (hereinafter referred to as "ONU") using a 1×N passive optical splitter. Recently, in the field of ITU-T (International Telecommunication Union-Telecommunication section), the contents of standardization of an asynchronous transfer mode-passive optical network (hereinafter referred to as "ATM-PON") system have been proposed in ITU-T G.982, ITU-T G.983.1, and ITU-T G.983.3. Moreover, in the field of IEEE 802.3ah TF of the IEEE (Institute of Electrical and Electronics Engineers), a standardization work of a gigabit Ethernet based the PON (hereinafter referred to as "GE-PON") is in progress.

The standardization of a point-to-point type gigabit Ethernet and MAC (medium access control) technology for ATM-PON has been completed, and the contents thereof are described in IEEE802.3z and ITU-T G.983.1. Also, U.S. Pat. No. 5,973,374 entitled, "Protocol for data communication over a point-to-multipoint passive optical network", which was invented by Gigad Ghaib et al. and issued on Nov. 2, 1999, discloses in detail the MAC technology of ATM-PON.

FIG. 1 illustrates a conventional point-to-point type gigabit Ethernet standard frame structure. In the point-to-point type gigabit Ethernet whose standardization has been completed, but the functions required for a point-to-multipoint PON system have not yet been specified.

FIG. 2 illustrates a schematic construction of a conventional ATM-PON system. As shown, the ATM-PON system includes an optical line terminal (OLT) 10 for playing a central role of providing information to the respective subscribers of an accessed network. An optical distribution network (ODN) 16 is connected to the OLT 10 and has a tree topology structure. During operation, the ODN 16 serves to distribute downstream data frames transmitted from the OLT 10 and multiplexes upstream data frames to the OLT 10. A plurality of optical network units (ONUs) 12a, 12b and 12c receive and provide the downstream data frames to the terminal users 14a, 14b and 14c, and also transmit data outputted from the terminal users to the ODN 16 as the upstream data frames. Note that the terminal users 14a, 14b and 14c represent various types of network terminals that can be used in the PON including network terminals (NTs).

As shown in FIG. 2, the conventional ATM-PON system performs the upstream and downstream transmission of fixed data frame, in which ATM cells having a size of 53 bytes are grouped together. The OLT 10 is configured to insert the downstream data to be distributed to the respective ONUs 12i in the downstream cells. For the upstream transmission, OLT 10 accesses the data transmitted from the plurality of ONUs 12a, 12b and 12c in a time division multiplexing (TDM) manner. As the ODN 16, which is connected between the OLT 10 and the plurality of ONUs 12a, 12b and 12c, is a passive element, the OLT 10 is operative to prevent data from colliding in the passive element according to a virtual distance correction algorithm known as a ranging algorithm. In addition, in case of the downstream data transmission from the OLT 10 to the plurality of ONUs 12a, 12b and 12c, the OLT 10 receives from and sends to the ONUs 12a, 12b and 12c an encryption key for security and OAM (operations, administration and maintenance) messaging applications. In this regards, a corresponding data field is prepared in the dedicated ATM cell or a general ATM cell for receiving and sending messages at predetermined intervals in the upstream/downstream frames.

With the development of the Internet technology, a subscriber requires more and more bandwidths, thus demanding an end-to-end transmission in the gigabit Ethernet technology, which is relatively cheap and capable of securing a higher bandwidth (of about 1 Gbps) transmission when compared to the traditional ATM technology. The ATM technology requires relatively expensive equipments and has a bandwidth limitation (of 622 Mbps at maximum), and further must perform the segmentation of IP (internet protocol) packets. Accordingly, in the PON structure of the network, the Ethernet system is more favored over the ATM system.

The ATM-PON system, as described above, constructs upstream and downstream frames on the basis of ATM cells having a fixed size, and uses the time division multiplexing (TDM) scheme with respect to the upstream transmission in accordance with the tree structure of a point-to-multipoint connection.

In of the field of gigabit Ethernet, the standardization of the GE-PON structure is now in progress. Currently, the function and implementation of an Ethernet PON, which transmits the Ethernet frames through a PON, are in progress now in the field of GE-PON standard. For the upstream transmission in the tree-shaped PON structure as described above, data of the respective ONUs 12i are accessed in the TDM scheme, and a scheduling algorithm is required for transmitting signals to avoid collisions in the ODN 16, which is a passive element.

In case of downstream transmission of 155.52 Mbps in the ATM-PON, 56 ATM cells constitute one frame, and two out of these cells are used as downstream PLOAM cells for controlling a physical layer. The PLOAM cells transfers information to the OLT using a pre-defined message to control the OLT. If the upstream message in the form of a mini-slot transfers information of an ONU 12i is which is the same as that of cells where queues are accumulated to the respective registered ONU 12i, the OLT 10 transfers the bandwidth-allocated transmission grant signals to the ONUs for the next upstream transmission by applying a bandwidth allocation algorithm on the basis of the information. That is, in ATM-PON as described above, the upstream and downstream frames are constructed based on the ATM cells having a fixed size. However, in a network in which IP, such as GE-PON, is an important transmission protocol, a grant/request transmission or message transmission on the basis of a fixed-size cell is inefficient.

Accordingly, a new system based on a variable packet size is needed in the transmission efforts using the Ethernet frame suitable for IP.

SUMMARY OF THE INVENTION

The present invention provides a method for transmitting data from a plurality of ONUs to a single OLT in a point-to-multipoint GE-PON system of the type having the plurality of ONUs connected to the OLT through an ODN.

One aspect of the present invention is to provide a method for providing a bandwidth allocation in a point-to-multipoint type network having one OLT and a plurality of ONUs, and to provide an efficient use of a frame exchange scheme to avoid collision during a message transmission.

According to one embodiment of the present invention, there is provided a method of transmitting data from a plurality of optical network units to an optical line terminal in a gigabit Ethernet-passive optical network system of the type including an optical line terminal with a scheduler and optical network units connected to the optical line terminal. The method includes the steps of: receiving, by the optical line terminal, bandwidth allocation request signals from the plurality of optical network units at a start of a first cycle, allocating transmission bandwidths to the respective optical network units in accordance with the bandwidth allocation request signals, and transmitting, by the optical line terminal, the allocated transmission bandwidths to the respective optical network units before a second cycle that follows the first cycle.

BRIEF DESCRIPTION OF THE DRAWINGS

The above features and advantages of the present invention will be more apparent from the following detailed description taken in conjunction with the accompanying drawings, in which:

FIG. 1 is a view illustrating a standard frame structure of a typical gigabit Ethernet.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details.

The present invention provides an efficient use of a frame exchange scheme for the data transmission in a GE-PON system. Briefly, the inventive method includes the steps of: sending, by OLT, a signal via a control frame to ONUs; in response to the signal, ONUs send a bandwidth request RAU signal to back to the OLT according to a TDM scheme; performing, by OLT, a scheduling process and notifying the scheduling result to the ONUs via a grant signal; and, in response to the scheduling result, sending frames by ONUs.

To help understand the invention, the following definition are used: A "scheduling process" is a specific process of determining the time slots and the slot sizes corresponding to the respective ONUs, in which the respective ONUs determine the data transmission time and period. The particular signal for giving the ONU an opportunity of transmitting data, which is included in the control frame of the downstream frame and transmitted to ONUs, is called a "grant signal". The particular signal which contains information on the bandwidth allocation that is requested by the respective ONUs in the upstream frame is called a "bandwidth (BW) allocation request signal".

Figure 2:
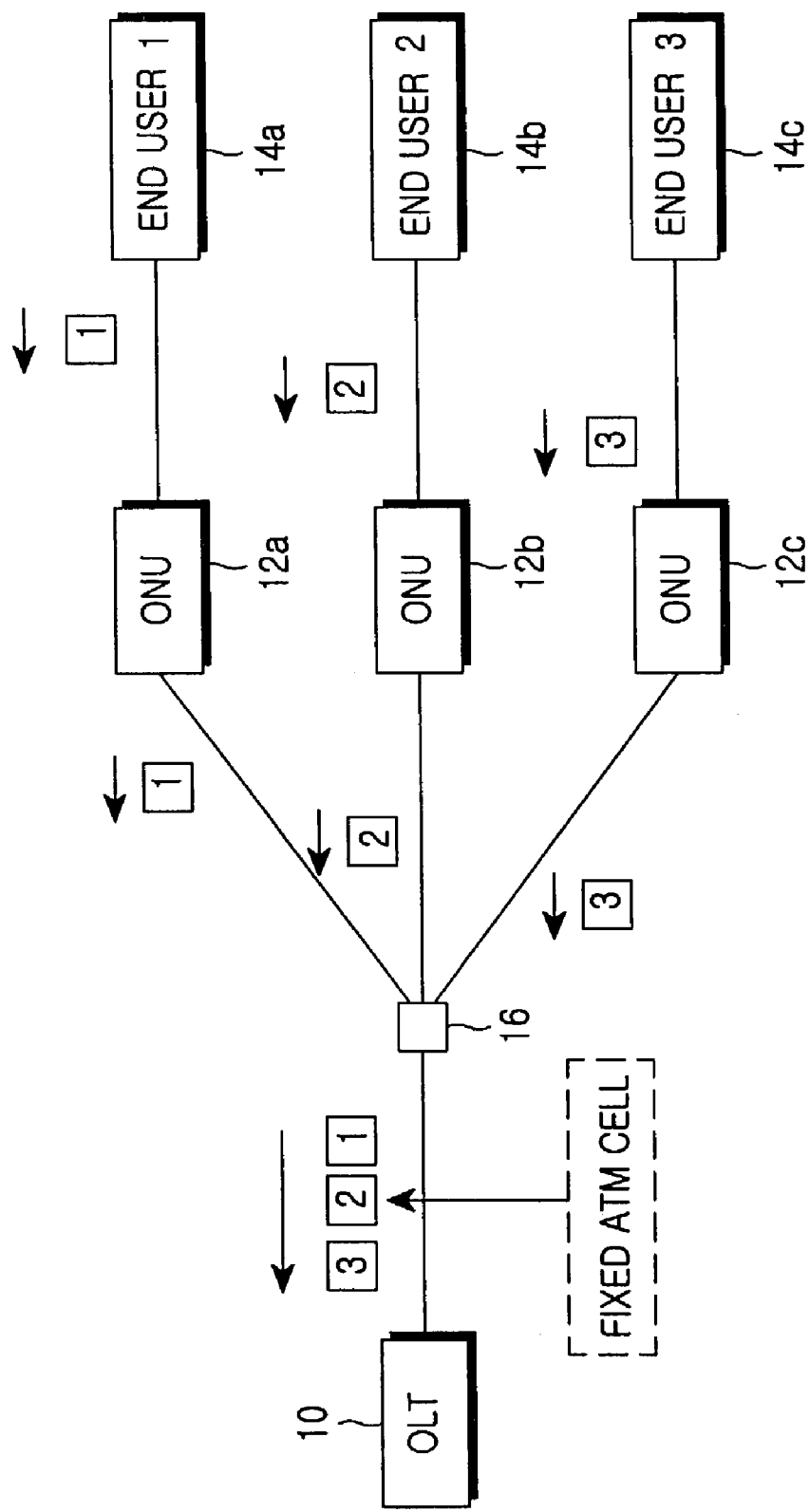
FIG. 2 is a block diagram of a typical ATM-PON system.
Figure 3:
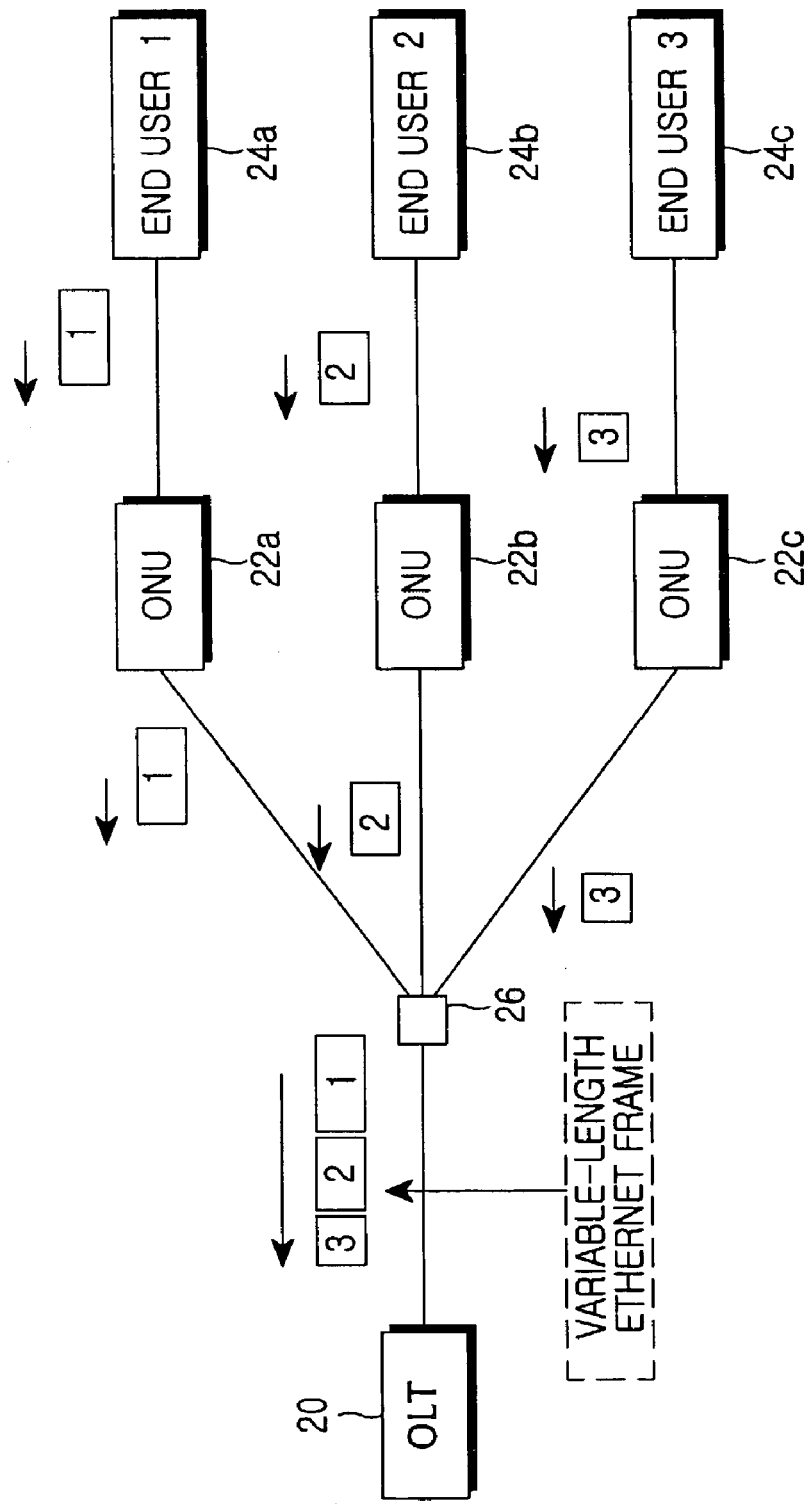
FIG. 3 is a block diagram of a GE-PON system according to an embodiment of the present invention.

FIG. 3 is a block diagram of a GE-PON system according to an embodiment of the present invention. As shown, the inventive GE-PON system may comprise a tree structure which includes one OLT 20 and a maximum of 32 ONUs 24*a*, 24*b* and 24*c*. Note that this structure depends on the given power budgets and distances between OLT 20 and the respective ONUs 24*a*, 24*b* and 24*c*. The ONUs 24*a*, 24*b* and 24*c* are installed in a distribution box of a building or an apartment complex and serve to provide diverse services, such as ADSL.

The OLT 20 receives data from a backbone network and distributes data to the respective ONUs 22*a*, 22*b* and 22*c* or accesses data from ONUs 22*a*, 22*b* and 22*c* in a TDM manner. In this regards, the OLT 20 is configured to perform a switch function of a MAC address of layer 2, and ONUs 22*a*, 22*b* and 22*c* are configured to perform an Internet protocol (IP) switch/router function of layer 2 and layer 3. The GE-PON system performs an initial ONU registration, periodic ONU registration, ranging, bandwidth allocation, etc. However, it should be noted that the teachings of the present invention is specially relates to the bandwidth allocation.

In the PON structure according to the embodiment of the present invention, the system operates to properly maintain the bandwidth allocation with respect to the respective ONUs 22*a*, 22*b* and 22*c*, so that QoS of the upstream/downstream data can be secured. The system further performs an encryption operation with respect to the downstream data transmitted by broadcasting source so that other neighboring ONUs are prevented from reading data of a certain ONU 22*a*, 22*b* or 22*c*. In addition, the system performs an OAM function of enabling the OLT 20 and ONUs 22*a*, 22*b* and 22*c* to mutually transfer a physical error when such an error is produced in communication.

Furthermore, the inventive system performs a ranging function of setting and virtually maintaining the same distance between OLT 20 and ONUs 22*a*, 22*b* and 22*c* so as to prevent data collision in the ODN 26 during the upstream transmission as the distances from the OLT 20 to the respective ONUs 22*a*, 22*b* and 22*c* may be different from one another after the data passes through ODN 26. The ranging (i.e., distance correction) procedure is to provide a correction of errors that may be produced due to other external variables, such as temperature, in addition to a synchronization correction against upstream/downstream time delay produced during the registration process of respective ONUs 22*a*, 22*b* and 22*c*.

In operation, the OLT 20 transmits a signal for granting ONUs 22*a*, 22*b* and 22*c* an opportunity for data transmission. The ONUs 22*a*, 22*b* and 22*c* in return transmit a bandwidth (BW) allocation request signal to the OLT 20. The BW request signal is a signal whereby ONUs 22a, 22b and 22c request the bandwidth allocation for data transmission to the OLT 20. Thereafter, the OLT 20 performs the "scheduling process" in accordance with the requests of the respective ONUs 22a, 22b and 22c, and then notifies the scheduling result to the ONUs 22a, 22b and 22c via grant signal. Thus, the ONUs, which received the scheduling result from the OLT 20, transmit data as allowed by the allowed bandwidths. This scheduling process is repeated for each cycle.

Figure 4:
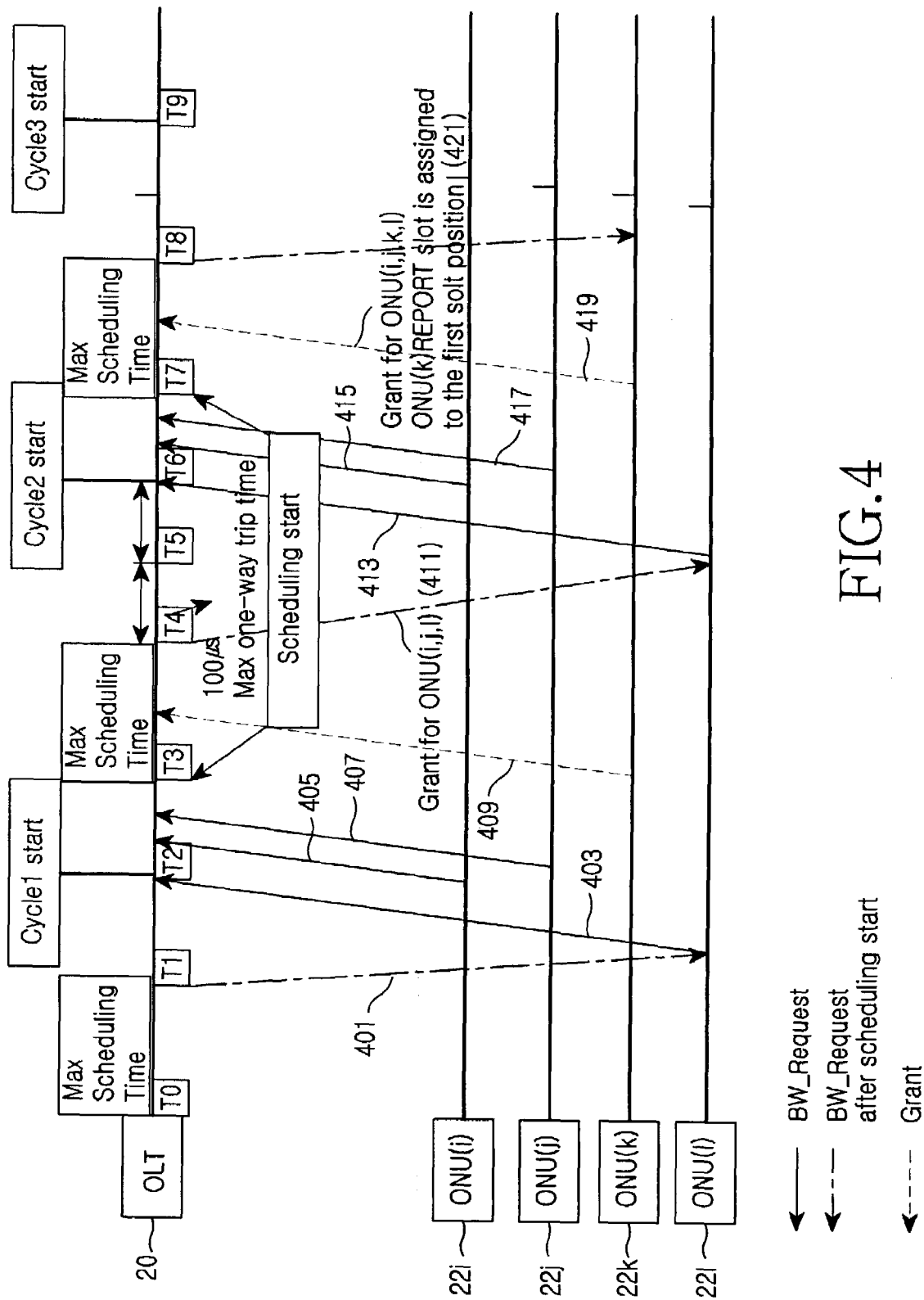
FIG. 4 is a view illustrating signaling protocol according to an embodiment of the present invention.

FIG. 4 is a view illustrating a frame exchange scheme according to an embodiment of the present invention. As shown, the respective positions of ONUs 22i to 22l represent the relative positions of actual physical distances of the ONUs 22i to 22l from the OLT 20. Hence, the ONU 1 is position farthest from OLT 20.

T2, T6 and T9 represent a time when a new time slot begins or when each scheduling process begins. T3 and T7 represent times when the scheduler of the OLT starts the scheduling process, which represents the assigned time slots and slot sizes of the respective ONUs, Thus, (T4–T3) and (T8–T7) represent the maximum time periods in which the scheduler is configured to perform its operation according to the embodiment of the present invention. (T6–T4) represents the maximum round trip time (RTT) of a frame travels from OLT to the farthest ONU. An average RTT is typically 200 μs. Note that the bandwidth allocation that the scheduler, which operates during (T4–T3), performs in response to the received BW request signals occurs during (T9–T6). That is, the result of scheduling process performed by the scheduler of the OLT 20 for a given cycle is reflected in the next cycle, as explained hereinafter.

As shown in FIG. 4, cycle 1 starts at T2 as the BW request signals 403 to 409 transmitted by ONUs 22i to 22l reach the OLT 20. Then, the scheduler operates during T3–T4 in cycle 1. The scheduler performs the scheduling process only with respect to the BW request signals that reach the OLT 20 from T0 to T3. Thus, the scheduling outcome that was processed during the period from T3 to T4 is allocated during the period from T6 to T9, which is in the next cycle, i.e., cycle 2.

When the scheduling process ends at T4, the OLT 20 includes the scheduling result in the grant signal 411 and transmits the result to ONUs 22i, 22j, 22l. The grant signal 411 transfers the scheduling result to the ONUs 22i, 22j, 22l, which transmitted the BW request signals 403 to 407 earlier. Thereafter, the ONUs 22i, 22j, 22l transmit data in a buffer to the OLT 20 at a time and for a time period allocated to themselves during the period from T6 to T9 in accordance with the scheduling result included in the received grant signal 411. The data from ONUs 22i, 22j, 22l are then transmitted to the OLT 20 through the ODN 26.

Meanwhile, the BW request signal 409 that reaches the OLT 20 at (T4–T3) period reaches after the scheduler of cycle 1 is completed, thus is not considered during the scheduling process in cycle 1. Thus, with respect to the BW request signals 409 and 419 that reach the OLT 20 after the scheduler of the corresponding cycle is completed, the bandwidth is allocated during the scheduling of the next cycle. Accordingly, the BW request signal 409 that reaches the OLT 20 in (T4–T3) period is scheduled in (T8–T7) in cycle 2 along with the BW request signals 413 to 417 that reach the OLT 20 in the same cycle; and as a result, the bandwidth assignment responsive to the BW request signals 409, and 413-417 are allocated in the next cycle 3. The scheduling result of the BW request signal 409 is included in the grant signal 421, and transferred to ONU(k) 22k.

Note that during the scheduling process by the OLT 20, the scheduling process can be performed from the time when one cycle is ended to the time obtained by a subtraction of a maximum RTT, as shown in FIG. 4. As such, the OLT 20 transmits the grant signal including the bandwidth allocation information to the ONUs 22i to 22l at T4 and T8, which represent the times when the scheduling processes of cycle 1 (T6–T2) and cycle 2 (T9–T6) are ended, respectively. Therefore, the bandwidth allocation is performed within a shorter number of cycles.

Note further that the maximum RTT in FIG. 4, which is approximately 200 μs, is calculated as follows. Since the signal transmission speed in an optical fiber is $\frac{2}{3} \times c$ (here, c is the speed of light, that is, approximately $3 \times 10^8$ m), the time to arrival at the OLT 20 or the ONU (in the embodiment, ONU (l)) becomes 100 μs if it is assumed that the maximum distance between the OLT 20 and ONU(l) is 20 km in GE-PON. Accordingly, the maximum round trip time (RTT) become 200 μs, that is twice 100 μs.

As such, the time set by the sum of [the time required for the reaching of the grant signals including the scheduling result transmitted by the OLT to the ONUs] and [the time required for the reaching of the data transmitted by the ONU allocated with the first bandwidth to the OLT] must be at least the maximum RTT (for example, the time period from T4 to T6 in FIG. 4). Accordingly, when ONU(l) receives a grant signal from OLT 20 and transmits the data accordingly in view of that ONU(l) is the farthest distant from the OLT 20, the time required for the data to reach the OLT 20 equals to the maximum RTT. Thus, the data transmitted by ONU(l) can reach the OLT 20 even though ONU(l), being the most farthest from the OLT 20, is first allocated with the bandwidth during this time. As a result, ONUs (i, j, k) which are located closer to OLT 20 than ONU(l) can receive the grant signal before (T6–T4) period.

Furthermore, with respect to the BW request signals 409 and 419 that reach after the scheduler is already driven during the periods of (T4–T3) or (T8–T7), the scheduler in the same cycle cannot process the BW request signals, thus the BW request signals are transferred to the next cycle by the scheduler. In case of transferring the BW request signals to the next cycle, the BW request signals 409 and 419 are allocated to the bandwidth with priority.

As described above, in the data transmission protocol in the gigabit Ethernet-passive optical network according to the present invention, the procedure of issuing grant signals and BW allocation request signals are processed rapidly, so that the bandwidth allocation and data transmission for respective ONUs can be performed within a short cycle. Therefore, the data transmission from the ONUs to the OLT can be efficiently performed in the GE-PON system having a variable packet length.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting data from a plurality of optical network units to an optical line termination in a gigabit Ethernet—passive optical network system including the optical line termination and a plurality of optical network units connected to the optical line termination, the method comprising the steps of:

receiving, by the optical line termination, one or more bandwidth allocation request signals from the plurality of optical network units at a start of a first cycle;

allocating bandwidths according to time slots and slot sizes of the plurality of optical network units in response to the bandwidth allocation request signals, wherein bandwidth is allocated first to the optical network unit associated with a maximum round trip time (RTT);

transmitting a result of the bandwidth allocation to the plurality of optical network units before a beginning of a second cycle that follows the first cycle, wherein a time difference between an end of the first cycle and the beginning of the second cycle is associated with the maximum round trip time; and transmitting the data, by the plurality of the optical network units, in the second cycle, in an order of the allocated bandwidth.

2. The method of claim 1, wherein the bandwidth allocation for the bandwidth allocation request signal reaching the optical line termination in the first cycle, after commencement of the step of allocating the transmission bandwidths to the plurality of optical network units in the first cycle, is performed in the second cycle.

* * * * *